United States Patent [19]
Thomas et al.

[11] Patent Number: 6,071,011
[45] Date of Patent: Jun. 6, 2000

[54] FILL-THROUGH-THE-TOP PACKAGE

[75] Inventors: Toby R. Thomas, Pittsford; Samuel D. Aversa, Farmington; John D. Athans, Victor, all of N.Y.

[73] Assignee: Tenneco Packaging, Inc., Lake Forest, Ill.

[21] Appl. No.: 09/373,312

[22] Filed: Aug. 12, 1999

[51] Int. Cl.[7] .................................................. B65D 33/16
[52] U.S. Cl. .............................. 383/64; 383/5; 383/122; 383/104; 383/203; 383/207; 383/63
[58] Field of Search .................................. 383/61, 63–65, 383/5, 122, 104, 203, 207; 53/139.2, 133.4

[56] References Cited

U.S. PATENT DOCUMENTS

| | | |
|---|---|---|
| Re. 27,174 | 9/1971 | Ausnit . |
| Re. 33,674 | 8/1991 | Uramoto . |
| Re. 34,554 | 3/1994 | Ausnit . |
| Re. 34,905 | 4/1995 | Ausnit . |
| Re. 34,906 | 4/1995 | Tamaki et al. . |

(List continued on next page.)

FOREIGN PATENT DOCUMENTS

| | | |
|---|---|---|
| 0 109 793 | 3/1987 | European Pat. Off. . |
| 0 276 554 | 8/1988 | European Pat. Off. . |
| 0 302 144 | 2/1989 | European Pat. Off. . |
| 0 239 319 | 9/1990 | European Pat. Off. . |
| 0 374 539 | 8/1993 | European Pat. Off. . |
| 1 350 126 | 12/1963 | France . |
| 2 613 326 | 10/1988 | France . |
| 57-105248 | 12/1980 | Japan . |
| 1 546 433 | 5/1979 | United Kingdom . |
| 2 080 412 | 2/1982 | United Kingdom . |
| 2 085 519 | 4/1982 | United Kingdom . |
| 2 130 173 | 5/1984 | United Kingdom . |
| 2 268 721 | 1/1994 | United Kingdom . |
| 2 268 731 | 1/1994 | United Kingdom . |
| WO 9529604 | 11/1995 | WIPO . |
| WO 9535046 | 12/1995 | WIPO . |
| WO 9535047 | 12/1995 | WIPO . |
| WO 9535048 | 12/1995 | WIPO . |
| WO 9924325 | 5/1999 | WIPO . |

*Primary Examiner*—Stephen K. Cronin
*Assistant Examiner*—Robin A. Hylton
*Attorney, Agent, or Firm*—Jenkens & Gilchrist

[57] ABSTRACT

A fill-through-the-top reclosable package includes first and second opposing body panels joined to each other along a pair of sides and a bottom bridging the pair of sides. The package is provided with a reclosable fastener extending along a package top disposed opposite the bottom. The fastener includes first and second opposing tracks. The first track includes a male profile, while the second track includes a female profile adapted to releasably interlock with the male profile. To provide tamper evidence, the first and second tracks may be joined to each other along an area of weakness. When making the package, the first track is first attached to the first panel, the package is filled with a product via a fill opening between the second track and the second panel, and then the second track is attached to the second panel.

8 Claims, 7 Drawing Sheets

U.S. PATENT DOCUMENTS

| | | |
|---|---|---|
| 1,992,152 | 2/1935 | Yeates . |
| 2,064,432 | 12/1936 | Keidel . |
| 2,506,311 | 5/1950 | Moore . |
| 2,560,535 | 7/1951 | Allen . |
| 2,848,031 | 8/1958 | Svec et al. . |
| 2,898,027 | 8/1959 | Scholle . |
| 2,978,769 | 4/1961 | Harrah . |
| 2,994,469 | 8/1961 | Troup et al. . |
| 3,054,434 | 9/1962 | Ausnit et al. . |
| 3,104,798 | 9/1963 | Stone . |
| 3,172,443 | 3/1965 | Ausnit . |
| 3,181,583 | 5/1965 | Lingenfelter . |
| 3,198,228 | 8/1965 | Naito . |
| 3,226,787 | 1/1966 | Ausnit . |
| 3,256,981 | 6/1966 | Kurtz . |
| 3,259,951 | 7/1966 | Zimmerman . |
| 3,262,634 | 7/1966 | Goodwin . |
| 3,282,493 | 11/1966 | Kamins et al. . |
| 3,313,471 | 4/1967 | Dickard et al. . |
| 3,325,084 | 6/1967 | Ausnit . |
| 3,326,399 | 6/1967 | Ausnit . |
| 3,338,285 | 8/1967 | Jaster . |
| 3,339,606 | 9/1967 | Kugler . |
| 3,368,740 | 2/1968 | Rohde . |
| 3,371,696 | 3/1968 | Ausnit . |
| 3,381,592 | 5/1968 | Ravel . |
| 3,387,640 | 6/1968 | Butler . |
| 3,416,986 | 12/1968 | Carley . |
| 3,417,675 | 12/1968 | Ausnit . |
| 3,425,469 | 2/1969 | Ausnit . |
| 3,426,396 | 2/1969 | Laguerre . |
| 3,437,258 | 4/1969 | Kugler ................................. 383/122 X |
| 3,456,867 | 7/1969 | Repko . |
| 3,460,337 | 8/1969 | Feild . |
| 3,462,068 | 8/1969 | Suominen . |
| 3,471,005 | 10/1969 | Sexstone . |
| 3,473,589 | 10/1969 | Gotz . |
| 3,532,571 | 10/1970 | Ausnit . |
| 3,535,409 | 10/1970 | Rohde . |
| 3,543,343 | 12/1970 | Staller et al. . |
| 3,565,147 | 2/1971 | Ausnit . |
| 3,608,439 | 9/1971 | Ausnit . |
| 3,613,524 | 10/1971 | Behr . |
| 3,619,395 | 11/1971 | Skendzic . |
| 3,625,270 | 12/1971 | Skendzic . |
| 3,633,642 | 1/1972 | Slegel . |
| 3,640,381 | 2/1972 | Kanada et al. ....................... 383/104 X |
| 3,655,503 | 4/1972 | Stanley et al. . |
| 3,679,511 | 7/1972 | Ausnit .................................. 383/63 X |
| 3,701,191 | 10/1972 | Laguerre . |
| 3,701,192 | 10/1972 | Laguerre . |
| 3,711,011 | 1/1973 | Kugler . |
| 3,722,672 | 3/1973 | Ebata . |
| 3,738,567 | 6/1973 | Ruda .................................. 383/203 X |
| 3,746,215 | 7/1973 | Ausnit et al. . |
| 3,780,781 | 12/1973 | Uramoto . |
| 3,785,111 | 1/1974 | Pike . |
| 3,790,992 | 2/1974 | Herz . |
| 3,818,963 | 6/1974 | Whitman . |
| 3,827,472 | 8/1974 | Uramoto . |
| 3,839,128 | 10/1974 | Arai . |
| 3,868,891 | 3/1975 | Parish . |
| 3,903,571 | 9/1975 | Howell . |
| 3,909,887 | 10/1975 | Yoshida . |
| 3,948,705 | 4/1976 | Ausnit . |
| 3,953,661 | 4/1976 | Gulley . |
| 3,991,801 | 11/1976 | Ausnit . |
| 4,003,972 | 1/1977 | Herz . |
| 4,094,729 | 6/1978 | Boccia . |
| 4,101,355 | 7/1978 | Ausnit . |
| 4,112,990 | 9/1978 | Anderson . |
| 4,118,166 | 10/1978 | Bartrum . |
| 4,153,090 | 5/1979 | Rifkin . |
| 4,189,050 | 2/1980 | Jensen et al. . |
| 4,189,809 | 2/1980 | Sotos . |
| 4,191,230 | 3/1980 | Ausnit . |
| 4,196,030 | 4/1980 | Ausnit . |
| 4,212,337 | 7/1980 | Kamp . |
| 4,235,653 | 11/1980 | Ausnit . |
| 4,240,241 | 12/1980 | Sanborn, Jr. . |
| 4,241,865 | 12/1980 | Ferrell . |
| 4,246,288 | 1/1981 | Sanborn, Jr. . |
| 4,249,982 | 2/1981 | Ausnit . |
| 4,252,238 | 2/1981 | Spiegelberg et al. . |
| 4,277,241 | 7/1981 | Schulze . |
| 4,279,677 | 7/1981 | Takahashi . |
| 4,285,376 | 8/1981 | Ausnit . |
| 4,295,919 | 10/1981 | Sutrina et al. . |
| 4,309,233 | 1/1982 | Akashi . |
| 4,341,575 | 7/1982 | Herz . |
| 4,355,494 | 10/1982 | Tilman . |
| 4,363,345 | 12/1982 | Scheibner . |
| 4,372,793 | 2/1983 | Herz . |
| 4,379,806 | 4/1983 | Korpman . |
| 4,415,386 | 11/1983 | Ferrell et al. . |
| 4,419,159 | 12/1983 | Herrington . |
| 4,428,477 | 1/1984 | Cristofolo . |
| 4,428,788 | 1/1984 | Kamp . |
| 4,430,070 | 2/1984 | Ausnit . |
| 4,437,293 | 3/1984 | Sanborn, Jr. . |
| 4,446,088 | 5/1984 | Daines . |
| 4,497,678 | 2/1985 | Nussbaum . |
| 4,498,939 | 2/1985 | Johnson . |
| 4,515,647 | 5/1985 | Behr . |
| 4,517,788 | 5/1985 | Scheffers . |
| 4,518,087 | 5/1985 | Goglio . |
| 4,522,305 | 6/1985 | Jacobsson . |
| 4,528,224 | 7/1985 | Ausnit . |
| 4,540,537 | 9/1985 | Kamp . |
| 4,555,282 | 11/1985 | Yano . |
| 4,561,109 | 12/1985 | Herrington . |
| 4,563,319 | 1/1986 | Ausnit et al. . |
| 4,573,203 | 2/1986 | Pepiatt . |
| 4,581,006 | 4/1986 | Hugues et al. . |
| 4,582,549 | 4/1986 | Ferrell . |
| 4,584,201 | 4/1986 | Boston . |
| 4,589,145 | 5/1986 | Van Erden et al. . |
| 4,601,694 | 7/1986 | Ausnit . |
| 4,602,405 | 7/1986 | Sturman et al. . |
| 4,612,153 | 9/1986 | Mangla . |
| 4,615,083 | 10/1986 | Mayerhofer . |
| 4,617,683 | 10/1986 | Christoff . |
| 4,620,320 | 10/1986 | Sullivan . |
| 4,638,913 | 1/1987 | Howe, Jr. . |
| 4,651,504 | 3/1987 | Bentsen . |
| 4,652,496 | 3/1987 | Yasufuku et al. . |
| 4,655,862 | 4/1987 | Christoff et al. . |
| 4,656,075 | 4/1987 | Mudge . |
| 4,663,915 | 5/1987 | Van Erden et al. . |
| 4,664,649 | 5/1987 | Johnson et al. . |
| 4,665,557 | 5/1987 | Kamp ........................................ 383/63 |
| 4,666,536 | 5/1987 | Van Erden et al. . |
| 4,673,383 | 6/1987 | Bentsen . |
| 4,682,366 | 7/1987 | Ausnit et al. . |
| 4,691,372 | 9/1987 | Van Erden . |
| 4,698,118 | 10/1987 | Takahashi et al. . |
| 4,703,518 | 10/1987 | Ausnit . |
| 4,709,398 | 11/1987 | Ausnit . |
| 4,709,533 | 12/1987 | Ausnit . |
| 4,710,157 | 12/1987 | Posey . |
| 4,713,839 | 12/1987 | Peppiatt . |
| 4,736,450 | 4/1988 | Van Erden et al. . |

| | | | | | | |
|---|---|---|---|---|---|---|
| 4,736,451 | 4/1988 | Ausnit . | | 5,085,031 | 2/1992 | McDonald . |
| 4,744,674 | 5/1988 | Nocek . | | 5,088,971 | 2/1992 | Herrington . |
| 4,755,247 | 7/1988 | Mudge . | | 5,092,684 | 3/1992 | Weeks . |
| 4,755,248 | 7/1988 | Geiger et al. . | | 5,092,831 | 3/1992 | James et al. . |
| 4,782,951 | 11/1988 | Griesbach et al. . | | 5,096,516 | 3/1992 | McDonald et al. . |
| 4,786,190 | 11/1988 | Van Erden et al. . | | 5,100,246 | 3/1992 | La Pierre et al. . |
| 4,787,880 | 11/1988 | Ausnit . | | 5,105,603 | 4/1992 | Natterer . |
| 4,790,126 | 12/1988 | Boeckmann . | | 5,107,658 | 4/1992 | Hustad et al. . |
| 4,791,710 | 12/1988 | Nocek et al. . | | 5,111,643 | 5/1992 | Hobock . |
| 4,792,240 | 12/1988 | Ausnit . | | 5,112,138 | 5/1992 | Peppiatt . |
| 4,807,300 | 2/1989 | Ausnit et al. . | | 5,116,301 | 5/1992 | Robinson et al. . |
| 4,812,074 | 3/1989 | Ausnit et al. . | | 5,121,997 | 6/1992 | La Pierre et al. . |
| 4,817,188 | 3/1989 | Van Erden . | | 5,127,208 | 7/1992 | Custer et al. . |
| 4,832,505 | 5/1989 | Ausnit et al. . | | 5,129,734 | 7/1992 | Van Erden . |
| 4,835,835 | 6/1989 | Gould . | | 5,131,121 | 7/1992 | Herrington et al. . |
| 4,840,012 | 6/1989 | Boeckmann . | | 5,147,272 | 9/1992 | Richison et al. . |
| 4,840,611 | 6/1989 | Van Erden et al. . | | 5,152,613 | 10/1992 | Herrington, Jr. . |
| 4,844,759 | 7/1989 | Boeckmann . | | 5,161,286 | 11/1992 | Herrington, Jr. et al. . |
| 4,846,585 | 7/1989 | Boeckmann et al. . | | 5,167,608 | 12/1992 | Steffens, Jr. et al. . |
| 4,850,178 | 7/1989 | Ausnit . | | 5,179,816 | 1/1993 | Wojnicki . |
| 4,855,168 | 8/1989 | Imaizumi . | | 5,186,543 | 2/1993 | Cochran . |
| 4,863,285 | 9/1989 | Claxton . | | 5,188,461 | 2/1993 | Sorensen . |
| 4,875,587 | 10/1989 | Lulham et al. . | | 5,189,764 | 3/1993 | Herrington et al. . |
| 4,876,842 | 10/1989 | Ausnit . | | 5,198,055 | 3/1993 | Wirth et al. . |
| 4,877,336 | 10/1989 | Peppiatt . | | 5,209,574 | 5/1993 | Tilman ..................................... 383/63 |
| 4,878,987 | 11/1989 | Ven Erden . | | 5,211,482 | 5/1993 | Tilman . |
| 4,889,731 | 12/1989 | Williams, Jr. . | | 5,224,779 | 7/1993 | Thompson et al. . |
| 4,890,935 | 1/1990 | Ausnit et al. . | | 5,247,781 | 9/1993 | Runge . |
| 4,892,414 | 1/1990 | Ausnit . | | 5,254,073 | 10/1993 | Richison et al. . |
| 4,892,512 | 1/1990 | Branson . | | 5,259,904 | 11/1993 | Ausnit . |
| 4,894,975 | 1/1990 | Ausnit . | | 5,273,511 | 12/1993 | Boeckmann . |
| 4,895,198 | 1/1990 | Samuelson . | | 5,283,932 | 2/1994 | Richardson et al. . |
| 4,902,140 | 2/1990 | Branson . | | 5,301,394 | 4/1994 | Richardson et al. . |
| 4,909,017 | 3/1990 | McMahon et al. . | | 5,301,395 | 4/1994 | Richardson et al. . |
| 4,923,309 | 5/1990 | Van Erden . | | 5,322,579 | 6/1994 | Van Erden . |
| 4,924,655 | 5/1990 | Posey . | | 5,334,127 | 8/1994 | Bruno et al. . |
| 4,925,316 | 5/1990 | Van Erden et al. . | | 5,366,294 | 11/1994 | Wirth et al. . |
| 4,925,318 | 5/1990 | Sorensen . | | 5,383,989 | 1/1995 | McMahon et al. . |
| 4,929,225 | 5/1990 | Ausnit et al. . | | 5,391,136 | 2/1995 | Makowka . |
| 4,941,307 | 7/1990 | Wojcik . | | 5,400,565 | 3/1995 | Terminella et al. . |
| 4,944,409 | 7/1990 | Busche et al. . | | 5,400,568 | 3/1995 | Kanemitsu et al. . |
| 4,947,525 | 8/1990 | Van Erden . | | 5,403,094 | 4/1995 | Tomic . |
| 4,969,309 | 11/1990 | Schwarz et al. . | | 5,405,478 | 4/1995 | Richardson et al. . |
| 4,969,967 | 11/1990 | Sorensen et al. . | | 5,405,629 | 4/1995 | Marnocha et al. . |
| 4,971,454 | 11/1990 | Branson et al. . | | 5,412,924 | 5/1995 | Ausnit . |
| 4,974,395 | 12/1990 | McMahon . | | 5,415,904 | 5/1995 | Takubo et al. . |
| 4,993,212 | 2/1991 | Veoukas . | | 5,425,216 | 6/1995 | Ausnit . |
| 5,005,707 | 4/1991 | Hustad et al. . | | 5,425,825 | 6/1995 | Rasko et al. . |
| 5,007,142 | 4/1991 | Herrington . | | 5,426,830 | 6/1995 | Richardson et al. . |
| 5,007,143 | 4/1991 | Herrington . | | 5,431,760 | 7/1995 | Donovan . |
| 5,010,627 | 4/1991 | Herrington et al. . | | 5,435,864 | 7/1995 | Machacek et al. . |
| 5,014,498 | 5/1991 | McMahon . | | 5,442,837 | 8/1995 | Morgan . |
| 5,017,021 | 5/1991 | Simonsen et al. . | | 5,442,838 | 8/1995 | Richardson et al. . |
| 5,020,194 | 6/1991 | Herrington et al. . | | 5,448,807 | 9/1995 | Herrington et al. . |
| 5,022,530 | 6/1991 | Zieke . | | 5,448,808 | 9/1995 | Gross . |
| 5,023,122 | 6/1991 | Boeckmann et al. . | | 5,456,928 | 10/1995 | Hustad et al. . |
| 5,024,537 | 6/1991 | Tilman . | | 5,461,845 | 10/1995 | Yeager . |
| 5,027,584 | 7/1991 | McMahon et al. . | | 5,470,156 | 11/1995 | May . |
| 5,033,868 | 7/1991 | Peppiatt . | | 5,482,375 | 1/1996 | Richardson et al. . |
| 5,036,643 | 8/1991 | Bodolay . | | 5,486,051 | 1/1996 | May . |
| 5,042,224 | 8/1991 | McMahon . | | 5,489,252 | 2/1996 | May . |
| 5,046,300 | 9/1991 | Custer et al. . | | 5,492,411 | 2/1996 | May . |
| 5,063,069 | 11/1991 | Van Erden et al. . | | 5,505,037 | 4/1996 | Terminella et al. . |
| 5,063,639 | 11/1991 | Boeckmann et al. . | | 5,509,735 | 4/1996 | May . |
| 5,063,644 | 11/1991 | Herrington et al. . | | 5,511,884 | 4/1996 | Bruno et al. . |
| 5,065,899 | 11/1991 | Tilman . | | 5,513,915 | 5/1996 | May . |
| 5,066,444 | 11/1991 | Behr . | | 5,519,982 | 5/1996 | Herber et al. . |
| 5,067,208 | 11/1991 | Herrington et al. . | | 5,525,363 | 6/1996 | Herber et al. . |
| 5,067,822 | 11/1991 | Wirth et al. . | | 5,542,902 | 8/1996 | Richison et al. . |
| 5,070,583 | 12/1991 | Herrington . | | 5,551,127 | 9/1996 | May . |
| 5,071,689 | 12/1991 | Tilman . | | 5,551,208 | 9/1996 | Van Erden . |
| 5,072,571 | 12/1991 | Boeckmann . | | 5,552,202 | 9/1996 | May . |

| | | |
|---|---|---|
| 5,557,907 | 9/1996 | Malin et al. . |
| 5,558,613 | 9/1996 | Tilman et al. . |
| 5,561,966 | 10/1996 | English . |
| 5,564,259 | 10/1996 | Stolmeier . |
| 5,573,614 | 11/1996 | Tilman et al. . |
| 5,582,853 | 12/1996 | Marnocha et al. . |
| 5,592,802 | 1/1997 | Malin et al. . |
| 5,613,934 | 3/1997 | May . |
| 5,622,431 | 4/1997 | Simonsen . |
| 5,625,927 | 5/1997 | Chu . |
| 5,628,566 | 5/1997 | Schreiter . |
| 5,638,586 | 6/1997 | Malin et al. ................... 383/63 X |
| 5,647,671 | 7/1997 | May . |
| 5,664,299 | 9/1997 | Porchia et al. . |
| 5,669,715 | 9/1997 | Dobreski et al. . |
| 5,681,115 | 10/1997 | Diederich et al. . |
| 5,682,730 | 11/1997 | Dobreski . |
| 5,711,751 | 1/1998 | Harmanoglu . |
| 5,713,669 | 2/1998 | Thomas et al. . |
| 5,725,312 | 3/1998 | May . |
| 5,775,812 | 7/1998 | St. Phillips et al. ................... 383/5 |
| 5,776,045 | 7/1998 | Bodolay et al. ................... 53/139.2 X |
| 5,782,733 | 7/1998 | Yeager . |
| 5,823,933 | 10/1998 | Yeager . |
| 5,906,438 | 5/1999 | Laudenberg . |
| 5,911,508 | 6/1999 | Dobreski et al. ................... 383/5 |
| 5,924,173 | 7/1999 | Dobreski et al. . |
| 5,956,924 | 9/1999 | Thieman ................... 53/133.4 X |
| 5,964,532 | 10/1999 | St. Phillips et al. ................... 383/5 |

FILL-THROUGH-THE-TOP PACKAGE

FIELD OF THE INVENTION

The present invention generally relates to packages to be filled with a product on a form, fill, and seal machine and, more particularly, to a reclosable package filled through its top on a form, fill, and seal machine.

BACKGROUND OF THE INVENTION

A typical reclosable package includes first and second opposing panels joined to each other along a pair of sides and a bottom bridging the pair of sides. A reclosable fastener extends along a package top disposed opposite the bottom. The fastener generally includes first and second opposing tracks. The first track includes a male profile, while the second track includes a female profile adapted to releasably interlock with the male profile. The first and second tracks are thermally fused to, or integrally formed with, the respective first and second panels. To open and close the fastener, the package may be provided with a slider mounted to the fastener.

If reclosable packages of the foregoing type are to be prepackaged with a product and then sold in a store, the packages are typically prepared on a horizontal or vertical form, fill, and seal machine. In the form, fill, and seal machine, the package is first formed into the shape of a pouch having a fill opening at either the top or the bottom. If the fill opening is disposed at the bottom, then the top is sealed prior to filling the package. Similarly, if the fill opening is disposed at the top, then the bottom is sealed prior to filling the package. Next, the package filled with the product via the fill opening. Finally, the fill opening is sealed shut to fully enclose the product within the package. If the product delivered to the package includes food, then the fill opening is typically provided at the package bottom and a tamper-evident feature is provided along the top. The tamper-evident feature indicates to a consumer whether or not the package has been tampered with prior to purchase.

Some reclosable packages include a gusset along the bottom which expands in response to filling the package with a product. The gusset is advantageous because it increases the volume of product that can be contained in the package and, when the gusset expands, it allows the package to stand up on a store shelf. The stand-up package obviates the use of additional features such as headers with holes for hanging the package from a hook or post. The bottom gusset, however, makes it less practical to provide a fill opening at the bottom because most of the product resides in the gusset.

SUMMARY OF THE INVENTION

In accordance with one aspect of the present invention, a fill-through-the-top reclosable package includes first and second opposing body panels joined to each other along a pair of sides and a bottom bridging the pair of sides. The bottom optionally includes a gusset. The package is provided with a reclosable fastener extending along a package top disposed opposite the bottom. The fastener includes first and second opposing tracks. The first track includes a male profile, while the second track includes a female profile adapted to releasably interlock with the male profile. To provide tamper evidence, the first and second tracks are joined to each other along an area of weakness. The first and second tracks are optionally provided with respective first and second fins joined to each other along the aforementioned area of weakness to effectively create a single fin comprised of the first and second fins. To open and close the fastener, the package is optionally provided with a slider mounted to the fastener.

The package is convertible between a pre-filled condition and a post-filled condition. In the pre-filled condition, the first track is connected to the first panel, but the second track is only connected to the second panel along the sides thereby creating a fill opening between the second track and the second panel in a region between the sides. After the package is filled with a product via the fill opening, the package is converted to the post-filled condition. In the post-filled condition, the second track is connected to the second panel to seal the fill opening.

In accordance with another aspect of the present invention, a method of making a reclosable package includes the following sequence of steps:

(a) supplying a web of plastic material;

(b) supplying a reclosable fastener including first and second opposing tracks, the first track including a male profile, the second track including a female profile adapted to releasably interlock with the male profile, the first and second tracks being joined to each other along an area of weakness;

(c) folding the web to provide first and second opposing panels;

(d) attaching the first track to the first panel;

(e) sealing the web such that the first and second panels are joined to each other along a pair of sides and a bottom bridging the pair of sides;

(f) filling the package with a product via a fill opening between the second track and the second panel; and (g) attaching the second track to the second panel to seal the fill opening.

In accordance with yet another aspect of the present invention, another method of making a reclosable package includes the following sequence of steps:

(a) supplying a web of plastic material in a longitudinal direction;

(b) supplying a reclosable fastener including first and second opposing tracks, the first track including a male profile, the second track including a female profile adapted to releasably interlock with the male profile;

(c) folding the web along one or more longitudinal folds to provide first and second opposing panels, the longitudinal folds creating a bottom of the package;

(d) attaching the first track to the first panel;

(e) sealing the web along a pair of sides, the bottom bridging the pair of sides;

(f) filling the package with a product via a fill opening between the second track and the second panel; and (g) attaching the second track to the second panel to seal the fill opening.

In accordance with a further aspect of the present invention, there is provided an apparatus for performing the above methods.

BRIEF DESCRIPTION OF THE DRAWINGS

Other objects and advantages of the invention will become apparent upon reading the following detailed description and upon reference to the drawings in which.

Figure 1:
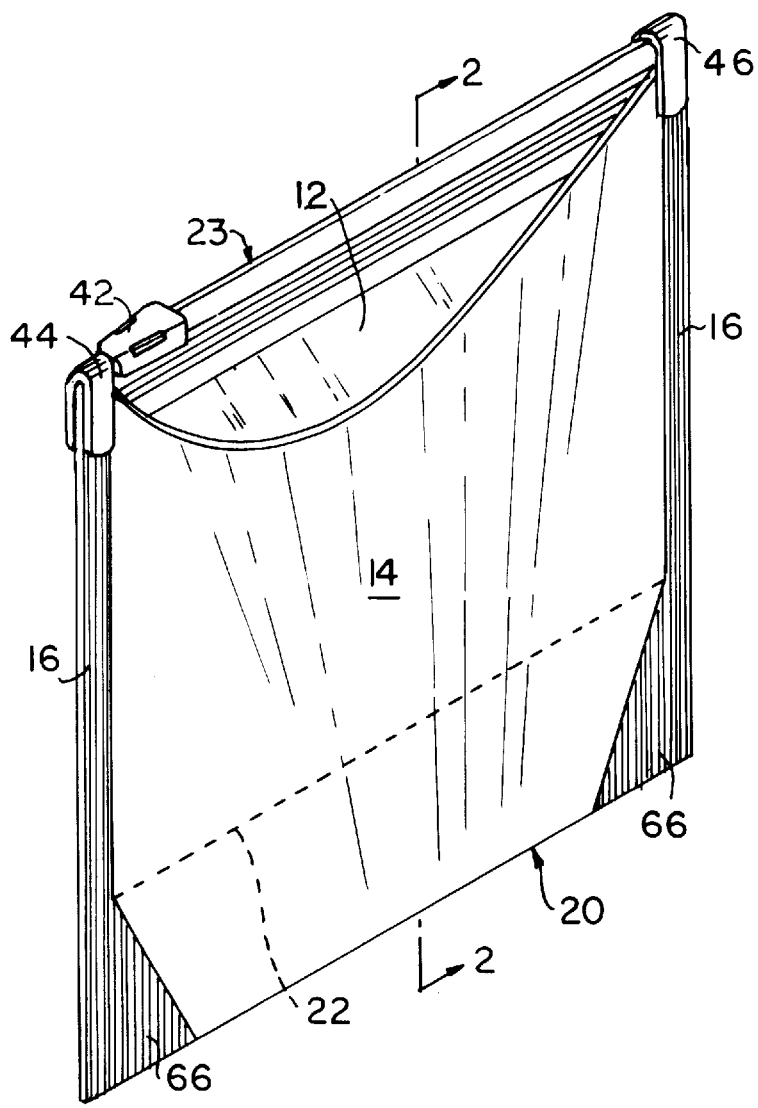
FIG. 1 is an isometric view of a reclosable plastic bag in a pre-filled condition embodying the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Figure 2:
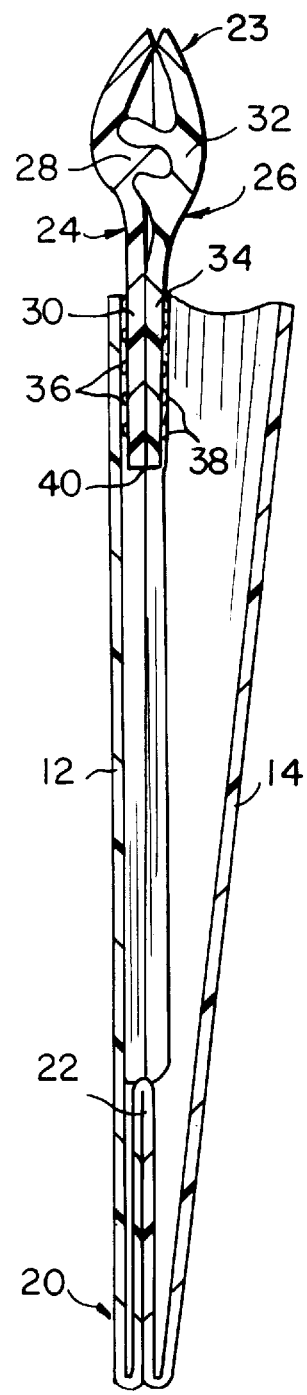
FIG. 2 is a sectional view taken generally along line 2—2 in FIG. 1.
Figure 3:
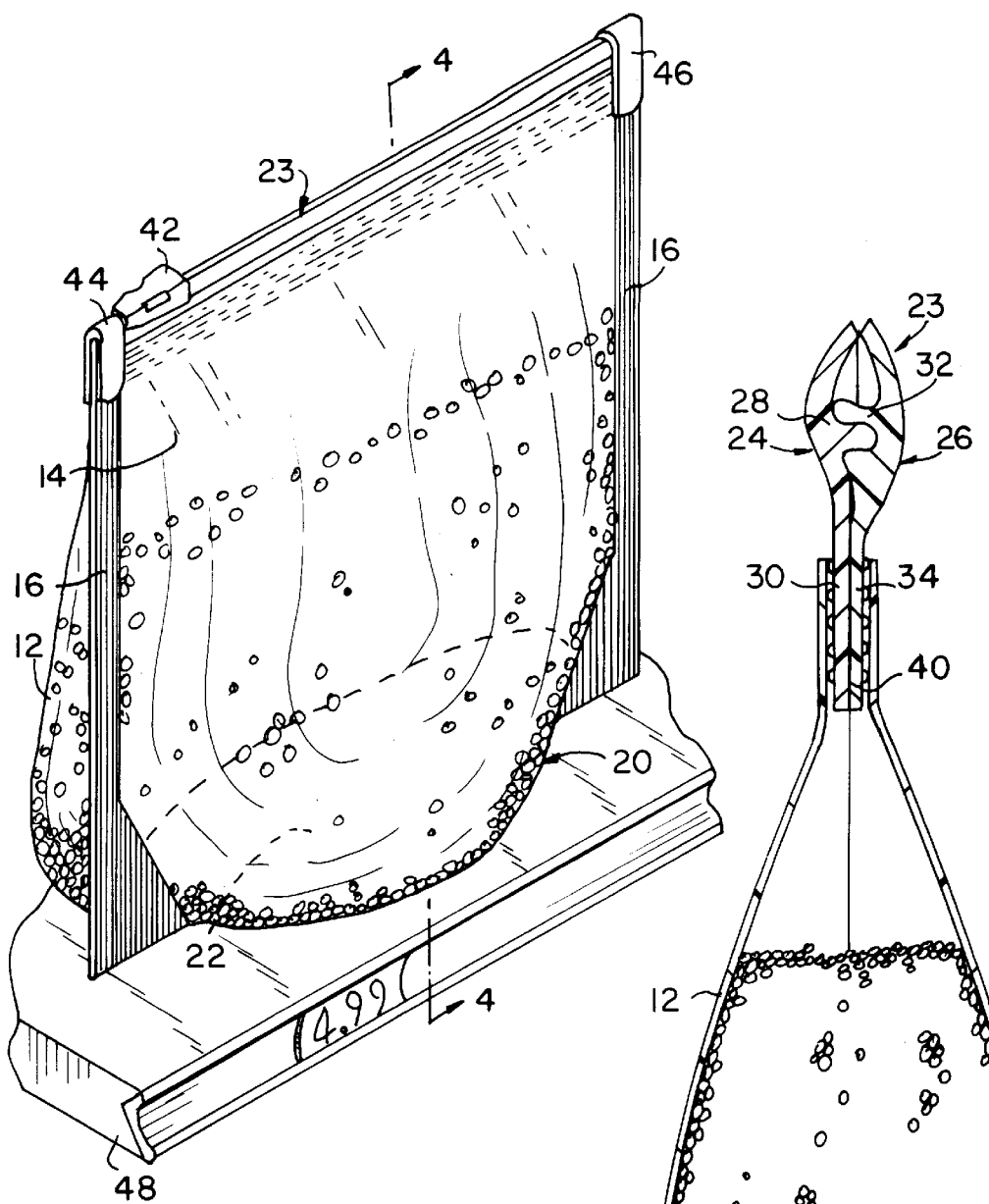
FIG. 3 is an isometric view of the reclosable plastic bag in a post-filled condition.
Figure 4:
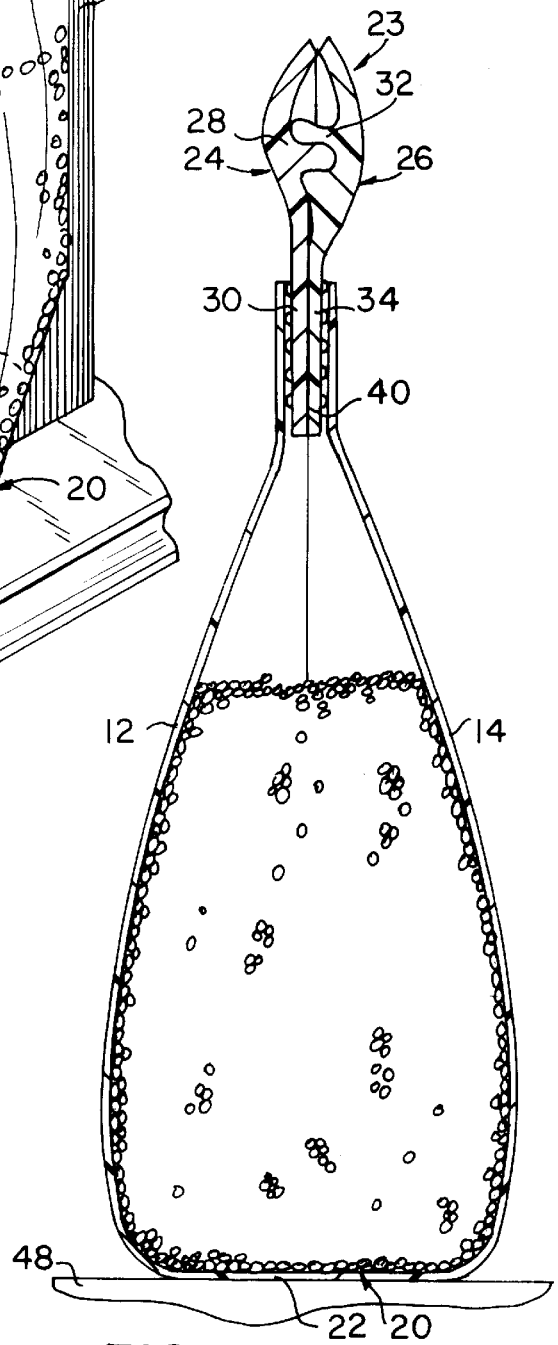
FIG. 4 is a sectional view taken generally along line 4—4 in FIG. 3.

Turning now to the drawings, FIGS. 1 and 3 depict a fill-through-the-top reclosable package 10, and FIGS. 2 and 4 depict a top portion of the package 10. Referring to FIGS. 1 through 4, the package 10 includes first and second opposing body panels 12 and 14 joined to each other along a pair of sides 16 and a bottom 20 bridging the pair of sides 16. The bottom 20 optionally includes a gusset 22.

The package 10 is provided with a reclosable fastener 23 extending along a package top disposed opposite the gusseted bottom 20. The fastener 23 includes first and second opposing tracks 24 and 26. The first track 24 includes a rib-type male profile 28 and a first fin 30 extending downward from the male profile 28, while the second track 26 includes a groove-type female profile 32 and a second fin 34 extending downward from the female profile 32. The male and female profiles 28 and 32 are adapted to interlock with each other. The first track 24 includes a plurality of narrow first sealant ribs 36 on an outer surface of the first fin 30 to facilitate connecting the first fin 30 to the first panel 12, and the second track 26 includes a plurality of narrow second sealant ribs 38 on an outer surface of the second fin 34 to facilitate connecting the second fin 34 to the second panel 14. To provide tamper evidence, lowermost ends of the first and second fins 30 and 34 are joined to each other along a line of weakness 40 to effectively create a single fin comprised of the first and second fins 30 and 34. The line of weakness 40 may be a scored line, a perforated line, a thinned die line, or a tear strip. In an alternative embodiment, the first and second tracks 24 and 26 do not include the respective depending fins 30 and 34, and tamper evidence is provided by joining the lowermost ends of the profiles 28 and 34 instead of the lowermost ends of the fins.

To open and close the fastener 23, the package 10 is optionally provided with a slider 42 mounted to the fastener 23. The slider 42 disengages the profiles 28 and 32 in response to movement along the fastener 23 in an opening direction and engages the profiles 28 and 32 in response to movement along the fastener 23 in a closing direction. To accommodate the slider 42 and make it difficult to open the fastener 23 without using the slider 42, the fastener 23 is preferably free of pull flanges extending upwardly from the male and female profiles 28 and 32. To stop movement of the slider 42 near the sides 16 of the package 10 and thereby prevent the slider 42 from sliding off the end of the fastener 23, a pair of end terminations 44 and 46 are mounted to the fastener 23 near the respective sides 16 of the package 10. The end termination 44 stops movement of the slider 42 in the opening direction, while the end termination 46 stops movement of the slider 42 in the closing direction. The end terminations 44 and 46 may be a separate element attached to the fastener 23, as shown in FIGS. 1 and 3, or may be integrally formed with the fastener 23. Examples of end terminations are disclosed in U.S. Pat. Nos. 5,088,971 to Herrington, 5,131,121 to Herrington et al., 5,161,286 to Herrington et al., 5,405,478 to Richardson et al., 5,442,837 to Morgan, 5,448,807 to Herrington, 5,482,375 to Richardson et al., and 5,924,173 to Dobreski et al., which are incorporated herein by reference in their entireties.

The package 10 is convertible between a pre-filled condition and a post-filled condition. In the pre-filled condition shown in FIGS. 1 and 2, the first fin 30 is connected to the first panel 12, but the second fin 34 is not connected to the second panel 14, except along the sides 16, thereby creating a fill opening between the second fin 34 and the second panel 14. After the package 10 is filled with a product via the fill opening, the package 10 is converted to the post-filled condition shown in FIGS. 3 and 4. In the post-filled condition, the second fin 34 is connected to the second panel 14 to seal the fill opening. If the bottom 20 includes the gusset 22, the gusset 22 expands in response to filling the package 10 with the product. The gusset 22 is advantageous because it increases the volume of product that can be contained in the package 10 and, when the gusset 22 expands, it allows the package 10 to stand up on a store shelf 48. The stand-up package 10 obviates the use of additional features such as headers with holes for hanging the package from a hook or post.

Figure 5:
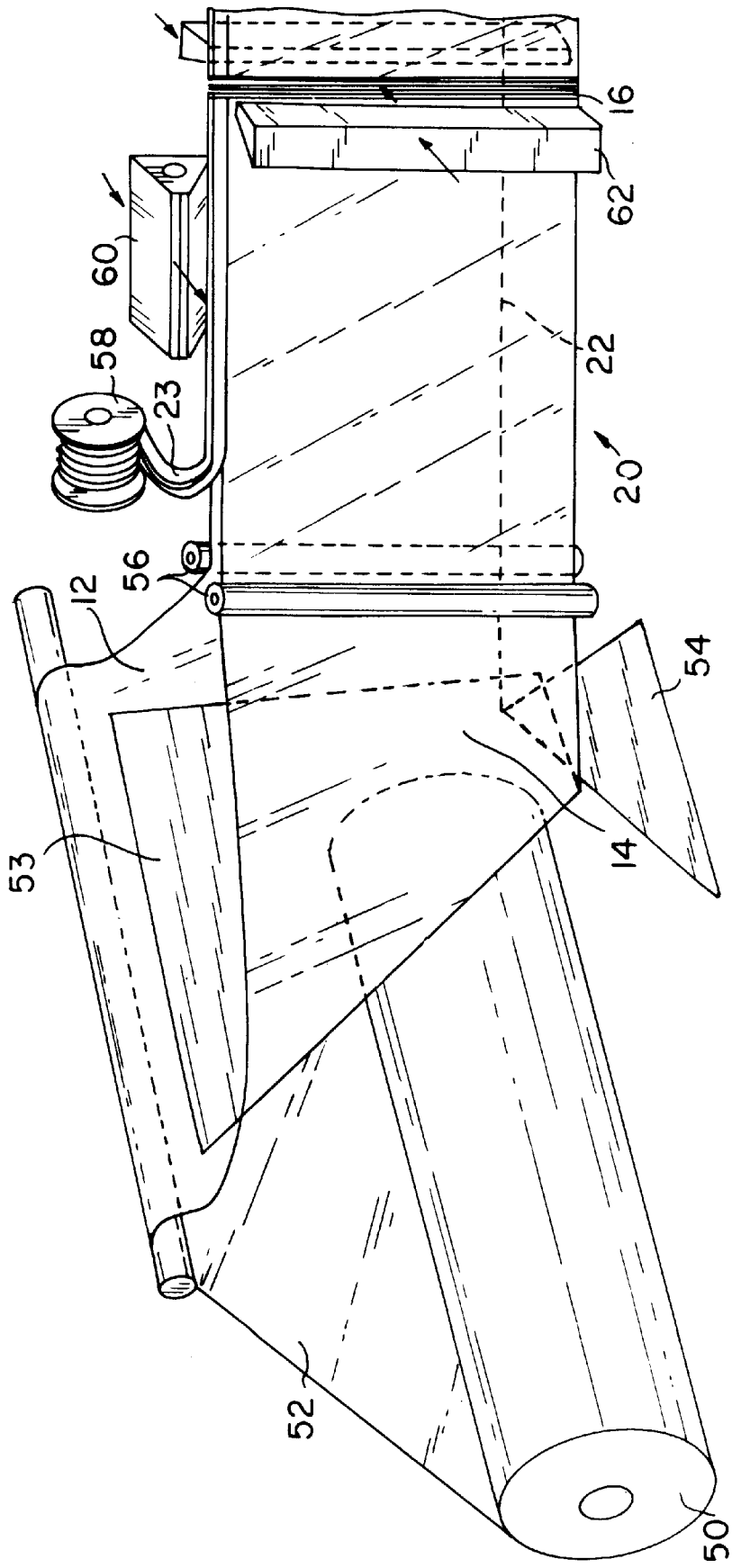
FIG. 5 are a diagrammatic representation of a method and apparatus for making and filling the reclosable plastic bag.

In accordance with another aspect of the present invention, there is provided a method and apparatus for making and filling the reclosable package 10. The method and apparatus are illustrated in FIGS. 5, 6, 7, 8, and 9. Referring first to FIG. 5, a core 50 supplies a web 52 of plastic material. A folder 53 folds the web 52 to provide first and second opposing panels 12 and 14 joined along a bottom 20 having one or more fold lines. The folder 53 optionally includes a gusset point 54 that creates a gusset 22. The folded web 52 is conveyed between a pair of rollers 56 that bring the first and second panels 12 and 14 is close proximity to each other. A spool 58 supplies a reclosable fastener 23 having the structure discussed above. The fastener 23 is fed between the upper portions of the first and second panels 12 and 14.

A sealer 60 seals the first fin 30 (see FIGS. 1 and 2) to the first panel 12 in the machine direction, i.e., the direction of movement of the web 52. The sealer 60 may be a stationary convective (hot air) sealer that does not contact the web 52, a reciprocating heated bar sealer that intermittently contacts the web 52, or a band sealer comprising a heated band that moves with the web 52 until the seal is made. The first sealant ribs 36 (see FIGS. 1 and 2) on the outer surface of the first fin 30 facilitate this attachment between the first fin 30 and the first panel 12. At this time, the second fin 34 remains disconnected from the second panel 14. Another reciprocating heated bar sealer 62 seals the first and second panels 12 and 14 to each other in the transverse direction. The side seals 16 are generated by the sealer 62 at bag width distances apart to create individual packages 10. If the bottom 20 includes a gusset 22, a heated bar sealer creates a pair of angle seals 66 (FIG. 1) along the gusset 22 on opposite sides of each side seal 16. The first and second panels 12 and 14 are attached to each other at the angle seals 66.

Referring back to FIGS. 1 and 2, if the packages 10 are provided with respective sliders 42, the sliders 42 are mounted to the fastener 23 at bag width distances apart either before the fastener 23 is attached to the web 52 or after the fastener 23 is attached to the web 52. To stop movement of the slider 42 near the sides 16 of each package 10, a pair of end terminations 44 and 46 are mounted to the fastener 23 on opposite sides of each side seal 16.

The sliders 42 may be installed using various techniques. For example, the slider 42 may have hinged wings that fold and snap permanently in place to attach the slider 42 to the fastener 23. Further details concerning such a hinged slider may be obtained from U.S. Pat. Nos. 5,010,627, 5,063,644, and 5,070,583 to Herrington, which are incorporated herein by reference in their entireties. In an alternative embodiment, the slider 42 may have a pair of side walls that are temporarily flexed away from each other as the slider 42 is mounted on the fastener 23 and then returned to their original position after the slider 42 is mounted. In another alternative embodiment, prior to the formation of the side seals, the fastener 23 is cut apart at a location where a side seal is to be generated, the ends formed by the cutter are moved laterally relative to each other to expose the ends, and the slider 42 is threaded onto one of the exposed ends. Further details concerning this technique of inserting a slider through a split fastener may be obtained from U.S. Pat. No. 5,431,760 to Donovan, which is incorporated herein by reference in its entirety. In yet another alternative embodiment, prior to the formation of the side seals, the fastener 23 is notched at a location where a side seal is to be generated and the slider 42 is threaded onto the fastener 23 via the notch. The notch is sized to accommodate the slider 42. Further details concerning this technique of inserting a slider onto a notched fastener may be obtained from U.S. application Ser. No. 09/307,937 to Provan et al. entitled "Zipper and Zipper Arrangements and Methods of Manufacturing the Same", filed May 10, 1999, and incorporated herein by reference in its entirety.

After forming the side seals 16 and installing such optional components as a slider 42 and end terminations 44 and 46, a cutter separates the packages 10 from each other at the side seals 16. Each package 10 is then placed beneath a fill tube having a spout that is inserted into a fill opening between the second fin 34 and the second panel 14 (see FIGS. 1 and 2). The fill tube conveys a predetermined amount of product to the interior of the package 10. The gusset 22 expands in response to filling the package 10 with the product.

Figure 6:
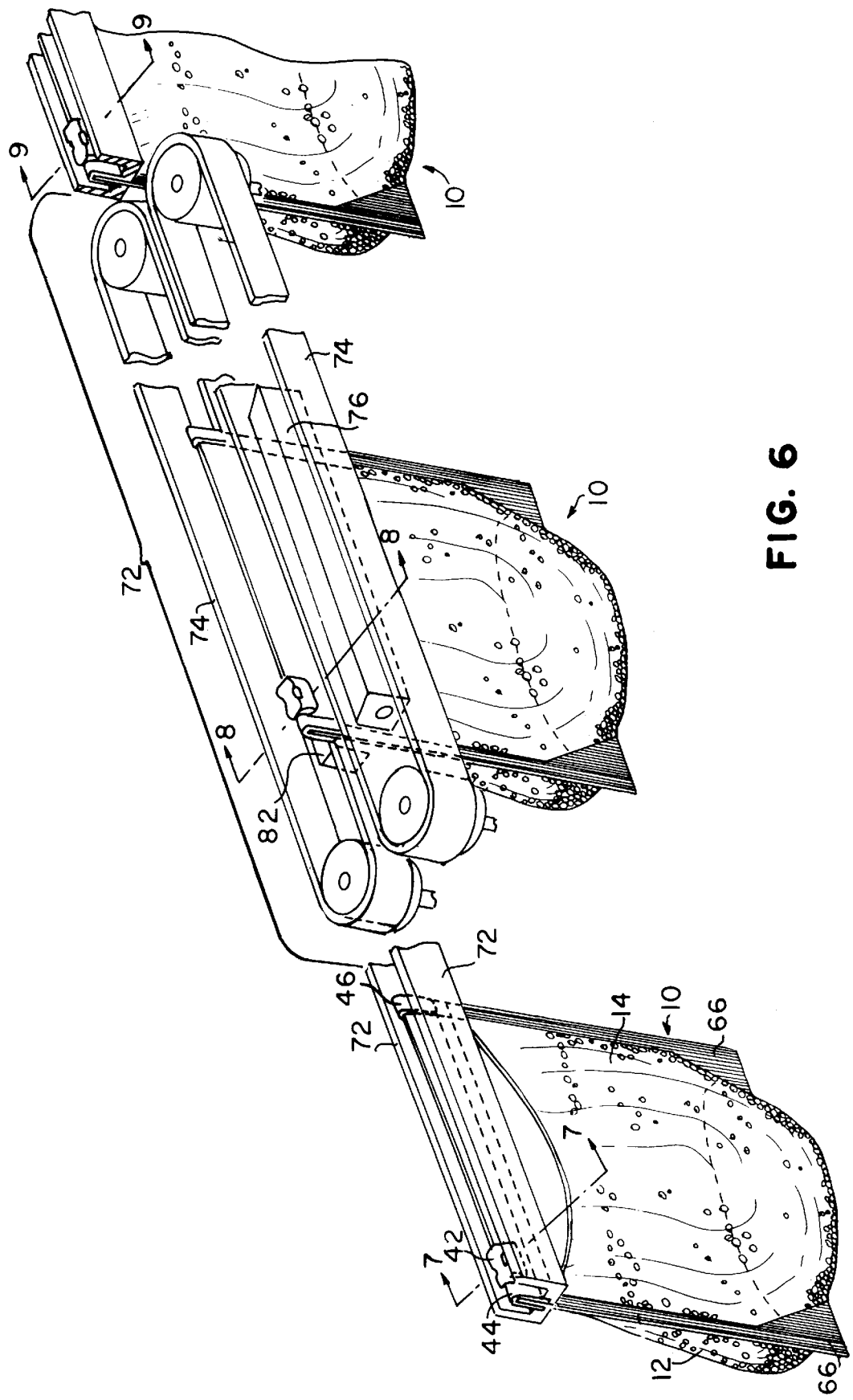
FIG. 6 is a diagrammatic representation of a method and apparatus for sealing the reclosable plastic bag.
Figure 7:
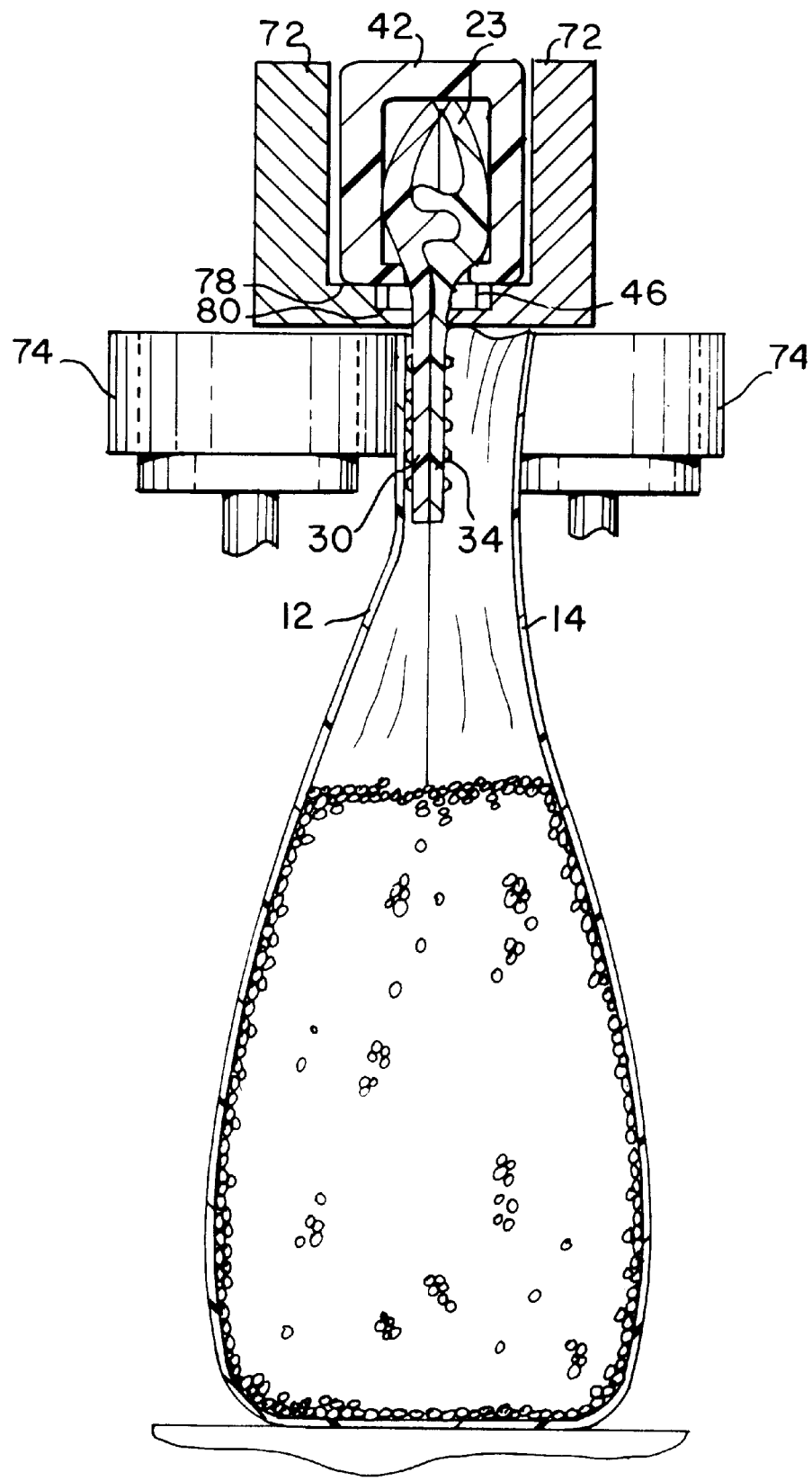
FIG. 7 is a sectional view taken generally along line 7—7 in FIG. 6.

FIG. 6 illustrates a method and apparatus for sealing the filled packages 10 so that they are ready for shipment to and display at a store. The apparatus includes a pair of spaced, profiled guides 72, a pair of moving members 74, a reciprocating heated bar sealer 76, and a stationary backing plate 82. The profiled guides 72 are shaped in cross-section to support each package by either the fastener 23, the slider 42, and/or the end terminations 44 and 46. As best shown in FIG. 7, the illustrated guides 72 include respective first steps 78 for engaging the respective lower shoulders of the slider 42 and respective second steps 80 for engaging the lower sides of the end terminations 44 and 46. The opposing:inner vertical faces of the guides 72 below the second steps 80 are spaced sufficiently apart to allow the fins 30 and 34 to fit therebetween, but sufficiently close to minimize the amount of air in the package head space above the product in the filled package. Each filled package 10 may be manually placed between the guides 72 or automatically fed into the guides 72 by conventional conveying equipment. The guides 72 are preferably made of a low-friction, rigid material such as hard anodized aluminum or ultra high density polyethylene.

Figure 8:
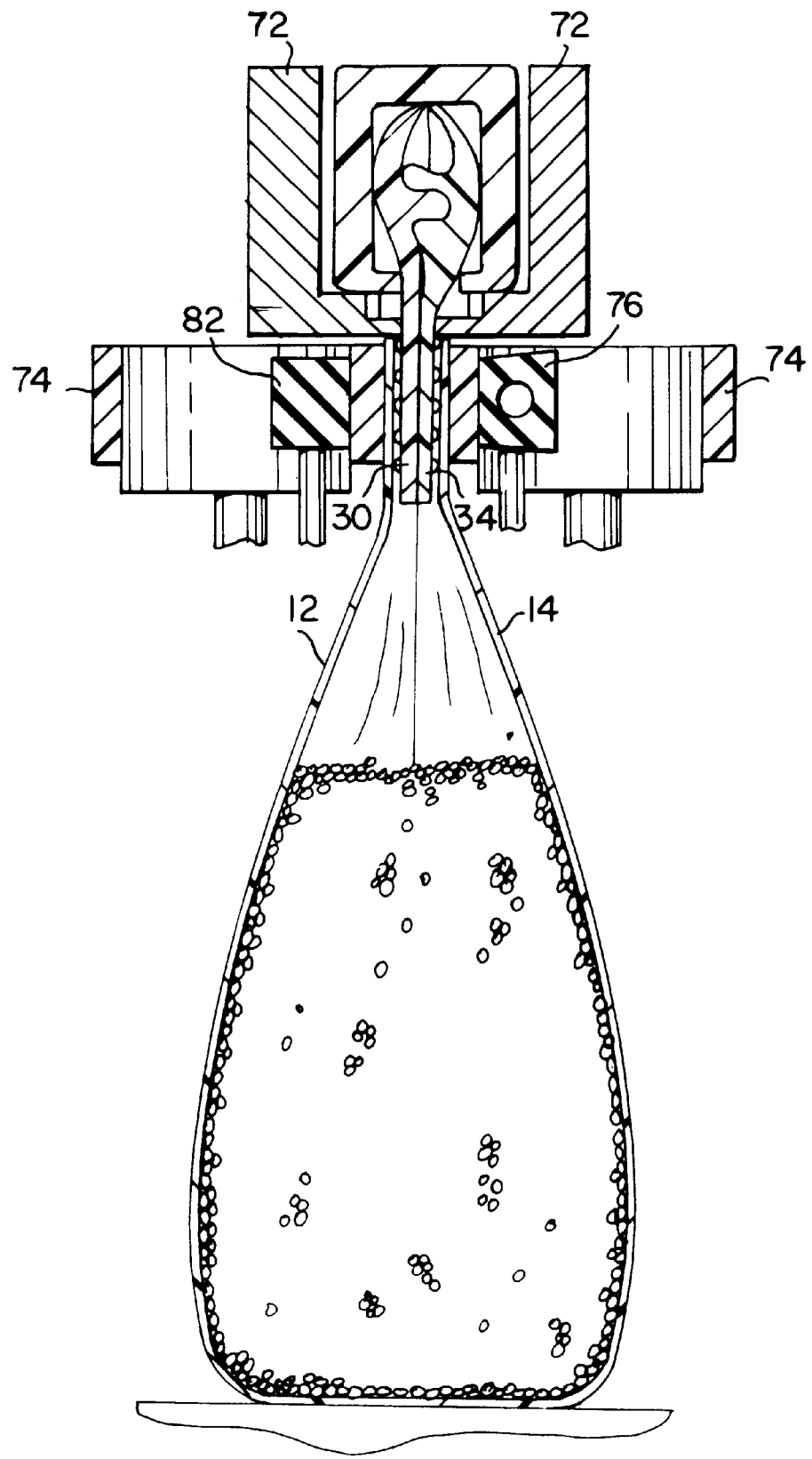
FIG. 8 is a sectional view taken generally along line 8—8 in FIG. 6.
Figure 9:
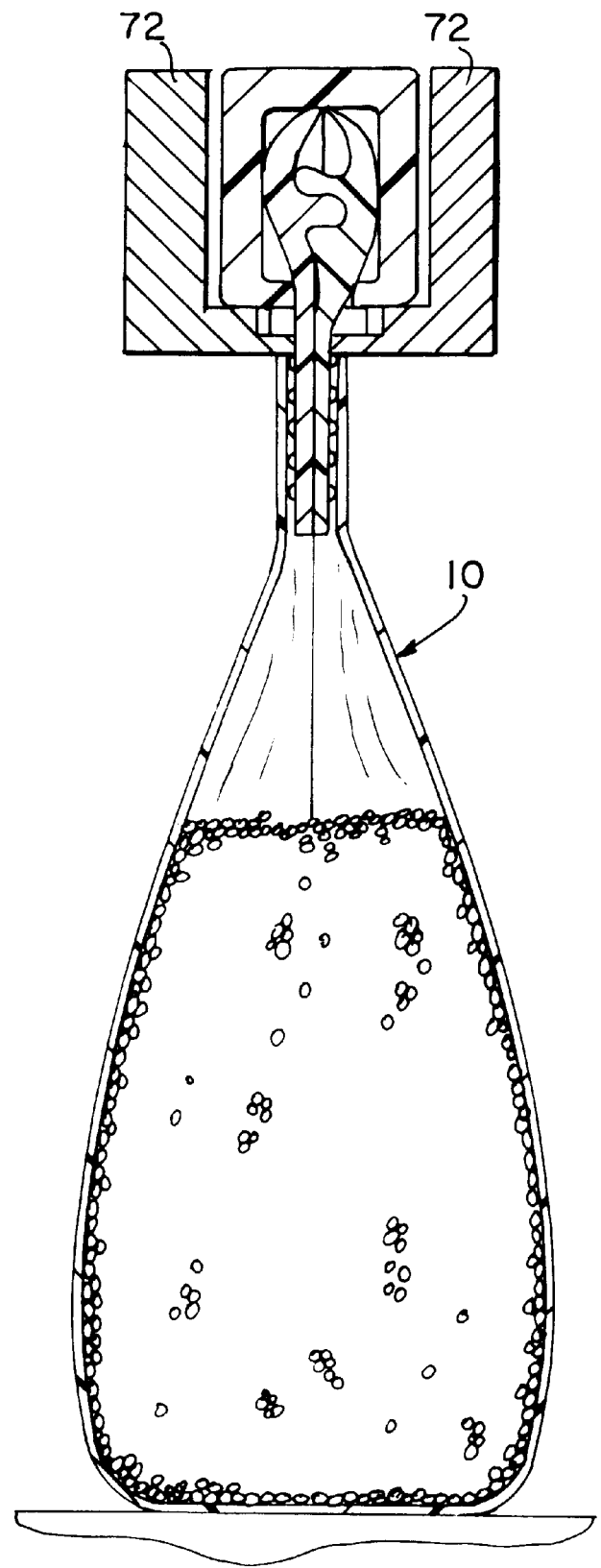
FIG. 9 is a sectional view taken generally along line 9—9 in FIG. 6.

The moving members 74 are disposed on opposite sides of the package 10 beneath the respective guides 72. The moving members 74 continuously or intermittently convey the packages 10 supported by the guides 72 to the sealer 76. Each moving member 74 is preferably a Teflon-coated glass-cloth belt encompassing a pair of spaced pulleys. As shown in FIGS. 6 and 8, the reciprocating heated bar sealer 76 is disposed within one of the conveyor belts, while the backing plate 82 is disposed within the other of the conveyor belts. When a package 10 is disposed between the sealer 76 and the backing plate 82, the sealer 76 presses the package 10 against the backing plate 82 (with the belts disposed therebetween) to attach the second fin 34 to the second panel 14 in the region between the sides 16, thereby sealing the fill opening of the filled package 10 (see FIG. 8). The backing plate 82 is optionally cooled with chilled water or cool air as such pressure is applied by the sealer 76. Additional cooling bars are optionally located within the moving members 74 downstream from the sealer 76 and the backing plate 82. Instead of the heated bar sealer 76, the apparatus for sealing the filled packages may include a heated band of metal, such as steel, lining the inner surface of the belt of each moving member 74 and moving with the belt. The heated bands inside the respective belts seal the second fin 34 to the second panel 14 as the belts convey the associated package 10 through the guides 72. Once the fill opening is sealed, the package 10 is ready for shipment to and display at a store. The fully sealed package 10 is shown in FIG. 9.

The package 10 may be composed of various plastic polymers, copolymers, coextrusions and/or laminations. The panels 12 and 14 are preferably comprised of monolayer or multi-layer combinations of: polyethylene (high, medium, low, linear low, and/or ultra low density polymers including metallocene); polypropylene (oriented and/or biaxially oriented); ethylene vinyl acetate; nylon (oriented and/or biaxially oriented); polyethylene terephthalate (oriented and/or biaxially oriented); polyvinyl chloride; ethylene vinyl alcohol (EVOH); polyvinylidene chloride (PVDC); polyvinyl alcohol (PVOH); polystyrene; foil and/or metalization; and paper. The slider 42 and end terminations 44 and 46 are preferably comprised of mono-material, blends, alloys, and/or co-polymers of: polyethylene (high, medium, low, linear low, and/or ultra low density polymers); polypropylene (oriented and/or biaxially oriented); ethylene vinyl acetate; nylon (oriented and/or biaxially oriented); thermoplastic polyesters; polycarbonate; acrylics; and/or polystyrene. The profiles 12 and 14 and the fins 30 and 34 are preferably comprised of mono-layer, blends, alloys, coextrusions, laminations and/or coatings of: polyethylene (high, medium, low, linear low, and/or ultra low density polymers including metallocene); polypropylene (oriented and/or biaxially oriented); ethylene vinyl acetate; nylon (oriented and/or biaxially oriented); polyethylene terephthalate (oriented and/or biaxially oriented); polyvinyl chloride; ethylene vinyl alcohol (EVOH); polyvinylidene chloride (PVDC); polyvinyl alcohol (PVOH); polystyrene; foil and/or metalization; and paper. The sealant ribs 36 and 38 are preferably comprised of mono-material, blends, and/or coextrusions of:

polyethylene (low, linear low, and/or ultra low density polymers including metallocene); ethylene vinyl acetate, adhesive or low melting temperature sealant.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A fill-through-the-top reclosable package, comprising:

first and second opposing body panels joined to each other along a pair of sides and a bottom bridging the pair of sides; and a reclosable fastener extending along a package top disposed opposite the bottom, the fastener including first and second opposing tracks, the first track including a male profile, the second track including a female profile adapted to releasably interlock with the male profile, the first and second tracks being joined to each other along an area of weakness, the first track being connected to the first panel along the package top between the sides;

wherein while the first track is connected to the first panel along the package top between the sides, the second track is only partially connected to the second panel along the package top and is free of connection to the second panel along at least a section of the package top between the sides so as to create a fill opening between the second track and the second panel, the fill opening allowing the package to be filled with a product through the package top.

2. The package of claim 1, wherein the bottom includes a gusset that expands in response to filling the package with the product.

3. The package of claim 1, further including a slider mounted to the fastener for opening and closing the fastener in response to movement therealong.

4. The package of claim 3, wherein the fastener is free of pull flanges extending upwardly from the male and female profiles.

5. The package of claim 1, wherein the area of weakness is selected from the group consisting of a scored line, a perforated line, and a thinned die line.

6. The package of claim 1, wherein the first track includes a plurality of first sealant ribs on an outer surface of the first track to facilitate connecting the first track to the first panel, and the second track includes a plurality of second sealant ribs on an outer surface of the second track to facilitate connecting the second track to the second panel.

7. The package of claim 1, wherein the second track is connected to the second panel only along the sides.

8. The package of claim 1, wherein the first and second tracks include respective first and second fins extending downward from the respective male and female profiles, the first and second fins being joined to each other along the area of weakness to effectively create a single fin comprised of the first and second fins.

* * * * *